(12) United States Patent
Kleinhoffer

(10) Patent No.: US 10,363,798 B2
(45) Date of Patent: Jul. 30, 2019

(54) INSERT FOR A MULTI-PART VEHICLE DOOR

(71) Applicant: Richard M Kleinhoffer, Romeo, MI (US)

(72) Inventor: Richard M Kleinhoffer, Romeo, MI (US)

(73) Assignee: FCA US LLC, Auburn Hills, MI (US)

( * ) Notice: Subject to any disclaimer, the term of this patent is extended or adjusted under 35 U.S.C. 154(b) by 22 days.

(21) Appl. No.: 15/683,934

(22) Filed: Aug. 23, 2017

(65) Prior Publication Data

US 2019/0061487 A1 Feb. 28, 2019

(51) Int. Cl.
*B62D 25/04* (2006.01)
*B60J 5/04* (2006.01)

(52) U.S. Cl.
CPC .......... *B60J 5/0411* (2013.01); *B60J 5/0463* (2013.01); *B60J 5/0468* (2013.01)

(58) Field of Classification Search
CPC ....... B60J 5/0411; B60J 5/0463; B60J 5/0468
See application file for complete search history.

(56) References Cited

U.S. PATENT DOCUMENTS

| | | | | | |
|---|---|---|---|---|---|
| 2,567,153 | A | * | 9/1951 | Jackson | B60J 1/08 49/166 |
| 3,661,420 | A | * | 5/1972 | Swanson | B62D 33/0207 105/380 |
| 4,057,286 | A | * | 11/1977 | Elonen | B60P 7/12 105/380 |
| 4,815,787 | A | * | 3/1989 | Hale | B60P 3/32 296/10 |
| 4,843,762 | A | * | 7/1989 | Grier | B60J 5/0405 49/378 |
| 5,141,277 | A | * | 8/1992 | Alexander | B60P 7/0807 296/43 |
| 5,823,601 | A | * | 10/1998 | Stanesic | B60R 13/01 296/41 |
| 5,857,731 | A | * | 1/1999 | Heim | B60J 5/0404 248/475.1 |
| 5,975,819 | A | * | 11/1999 | Cola | B60P 7/14 410/121 |
| 6,036,255 | A | * | 3/2000 | Lester | B60J 5/0416 296/146.1 |
| 6,036,256 | A | * | 3/2000 | Hilliard | B60J 1/08 160/182 |

(Continued)

FOREIGN PATENT DOCUMENTS

WO WO-9616828 A1 * 6/1996 ............ B60J 5/0412

*Primary Examiner* — Lori L Lyjak
(74) *Attorney, Agent, or Firm* — Ralph E Smith

(57) ABSTRACT

An insert for a vehicle door that has one part that is separable from another part of the door. The insert may have a body having a first end, a second end, a longitudinal axis extending between the first end and the second end and through the center of mass of the body, an opening at the first end, and an inner surface that defines a cavity extending from the opening toward the second end. The inner surface has a first portion and an opposing second portion wherein the distance from the first portion to the axis decreases from the first end toward the second end of the cavity along at least a portion of the cavity. The distance from the second portion to the axis increases from the first end toward the second end of the cavity along at least a portion of the cavity.

15 Claims, 3 Drawing Sheets

(56) References Cited

U.S. PATENT DOCUMENTS

| | | | | |
|---|---|---|---|---|
| 6,309,006 B1* | 10/2001 | Rippberger | .............. | B60J 7/104 296/100.16 |
| 6,886,881 B1* | 5/2005 | Henderson | ................ | B60J 1/08 296/146.2 |
| 7,201,453 B2* | 4/2007 | Vandewinckel | ....... | B62D 33/02 296/10 |
| 7,431,549 B1* | 10/2008 | Prentice | ................... | B60P 7/08 410/106 |
| 7,634,873 B2* | 12/2009 | Ruppert | ................ | B60J 5/0406 296/146.5 |
| 7,712,809 B2* | 5/2010 | Lynam | .................. | B60J 5/0404 248/475.1 |
| 8,100,458 B2* | 1/2012 | Senge | .................... | F16B 19/02 296/84.1 |
| 8,151,520 B2* | 4/2012 | Yamashita | .............. | B60J 10/21 296/146.2 |
| 2007/0262607 A1* | 11/2007 | Saito | ..................... | B60J 5/0402 296/146.2 |

* cited by examiner

INSERT FOR A MULTI-PART VEHICLE DOOR

FIELD

The present disclosure relates to an insert for a multi-part vehicle door.

BACKGROUND

Pin retainers for multi-part doors are typically used to allow removal of upper portions of the door which may or may not include a window. The upper portion of the door may contain the pins and the lower portion of the door may contain the pin retainers. The pins and retainers are aligned in a manner that intends the upper portion of the door to seal against the door frame. However, due to build variations from vehicle to vehicle, the upper door does not always seal properly against the door frame. For instance, in some cases the top of the upper door may be too far away from the door frame to create an adequate seal. This causes wind noise and rattling that can be disruptive to the vehicle occupants. In other cases, the top of the upper door may be too close to the door frame causing difficulties in closing the door.

SUMMARY

In at least one implementation, an insert for a vehicle door that has one part that is separable from another part of the door. The insert may have a body having a first end, a second end, a longitudinal axis extending between the first end and the second end and through the center of mass of the body, an opening at the first end, and an inner surface that defines a cavity extending from the opening toward the second end. The inner surface has a first portion and an opposing second portion wherein the distance from the first portion to the axis decreases from the first end toward the second end of the cavity (or from the first end of the body toward the second end of the body) along at least a portion of the cavity. The distance from the second portion to the axis increases from the first end toward the second end of the cavity along at least a portion of the cavity.

In at least some implementations, a vehicle door assembly includes a door having a first part and a second part. The first part is adapted to be connected to a vehicle for movement relative to the vehicle between open and closed positions, and the first part includes a first connection feature. The second part is releasably coupled to the first part for movement with the first part when coupled to the first part, and to permit the second part to be removed from the first part. The second part includes a second connection feature adapted to be releasably associated with the first connection feature. An insert is located between the first connection feature and the second connection feature, the insert has a body with a first end, a second end, a longitudinal axis extending between the first end and the second end and through the center of mass of the body, an opening at the first end, and an inner surface that defines a cavity extending from the opening toward the second end. The inner surface has a first portion and an opposing second portion. A distance from the first portion to the axis decreases from the first end toward the second end of the cavity along at least a portion of the cavity. The distance from the second portion to the axis increases from the first end toward the second end of the cavity along at least a portion of the cavity.

Multiple inserts may be provided with each insert having a cavity oriented at a different angle to the first part of the door to vary the inclination of the second part of the door relative to the first part when different inserts are used. Each of the first and second door parts may have multiple connection features, and an insert may be used between each set of connection features (where a set includes both a first and a second connection feature).

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
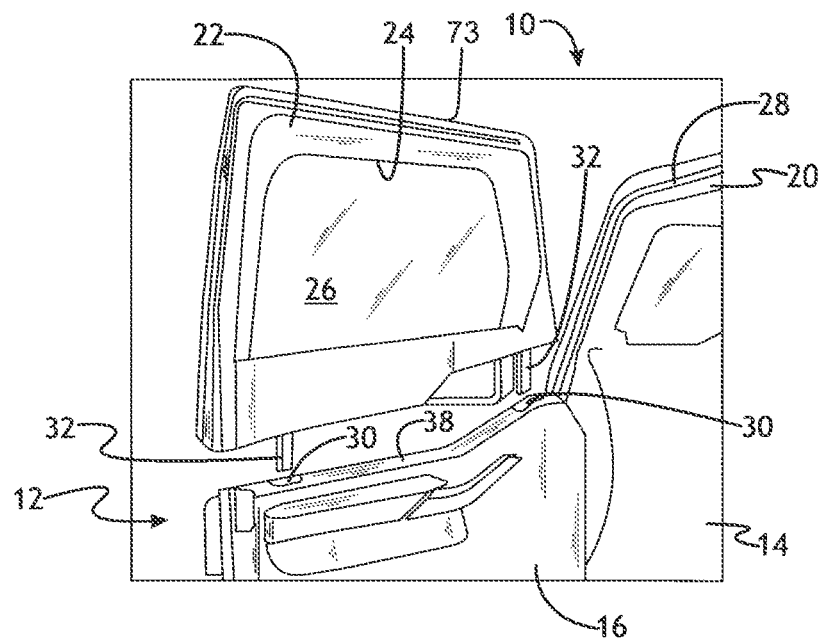
FIG. 1 is a fragmentary, perspective and partially exploded view of a vehicle with a two-part door.

Referring in more detail to the drawings, FIG. 1 illustrates a portion of a vehicle 10 having a door 12 that partially encloses or defines a passenger compartment 14 in which the vehicle driver and passengers sit during operation of the vehicle. The door 12 is formed in more than one part and a first part 16 may be coupled to the vehicle, such as by a hinge, to permit pivoted movement of the door relative to the remainder of the vehicle 10 between opened and closed positions. In this regard, the vehicle 10 defines a door opening 20 that the door 12 is moved relative to, and the door opening defines a point of ingress and egress of the passenger compartment 14. A second part 22 of the door 12 is removably or releasably carried by the first part 16 of the door so that the second part of the door may be removed from the first part of the door and recoupled to the first part of the door as desired. The vehicle 10 may have any number of doors 12, any or all of which may include a removable portion. Further, while the door 12 shown is in two parts, a door may have more than two parts with one or more than one removable section, if desired.

In at least some implementations, including that shown in FIG. 1, the first part 16 of the door 12 is a base or lower portion of the door and the second part 22 of the door is an upper portion of the door. The second part 22 may include a window opening 24, and may have a window 26 received therein. The window 26 could be carried by the second part 22, or the window could be carried by the first part 16 and vertically slidable relative to the first part to selectively open and close the window opening 24 in known manner.

When the second part 22 is installed on the first part 16, the portions of the door 12 move together and function as a solid, single part door. That is, there is limited or no relative movement between the door portions 16, 22 when they are coupled together. Further, when a window 26 or other component covers the window opening 24 in the second part (if a window opening is provided), the door 12 may fully cover and close the door opening 20 of the vehicle 10. To inhibit or prevent water and airborne things (e.g. windblown leaves, dust, dirt, bugs, etc) from entering the vehicle 10, one or more seals 28 may be provided between the door 12 and the vehicle 10. The seals 28 could be carried by one or both of the doors 12 and the vehicle 10, and are compressed between the door and the vehicle when the door is in the closed position.

As shown in FIGS. 1-4, in at least some implementations, the first and second door portions 16, 22 are coupled together by mating or cooperating connection features carried by the door parts 16, 22 so that the connection features and door parts 16, 22 may be releasably associated with each other. In the illustrated embodiment, the first door part 16 carries or includes a first connector feature, shown as a void 30, and the second door part 22 carries or includes a second connection feature, shown as a pin 32 that is insertable into the void. A pin 32 or more than one pin is carried by one door part, and in assembly, each pin is received within a void 30 of the other door part. Multiple pins 32 and voids 30 may be used to provide multiple points of coupling between the door parts 16, 22. Either part 16, 22 may include the pins 32 and the other door part 16 or 22 may include the corresponding voids 30, or each door part 16, 22 may include one or more of each of the pins 32 and voids 30. As set forth in more detail below, an insert 34 is received in one or more voids 30, so that the insert 34 is between the pins 32 and the first door part 16.

Figure 2:
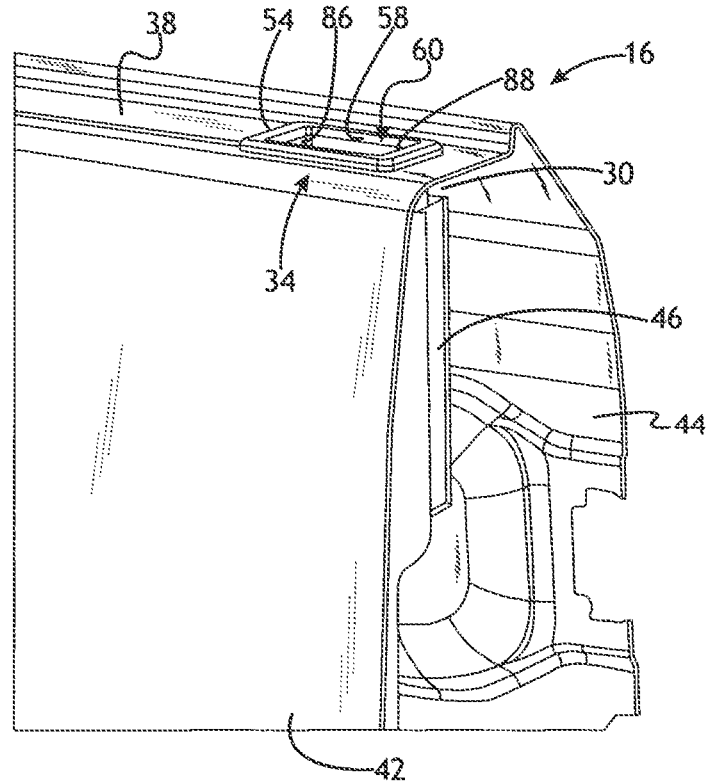
FIG. 2 is a fragmentary, cross-sectional view of a first part of the door including a retainer received in a cavity in the first part.
Figure 3:
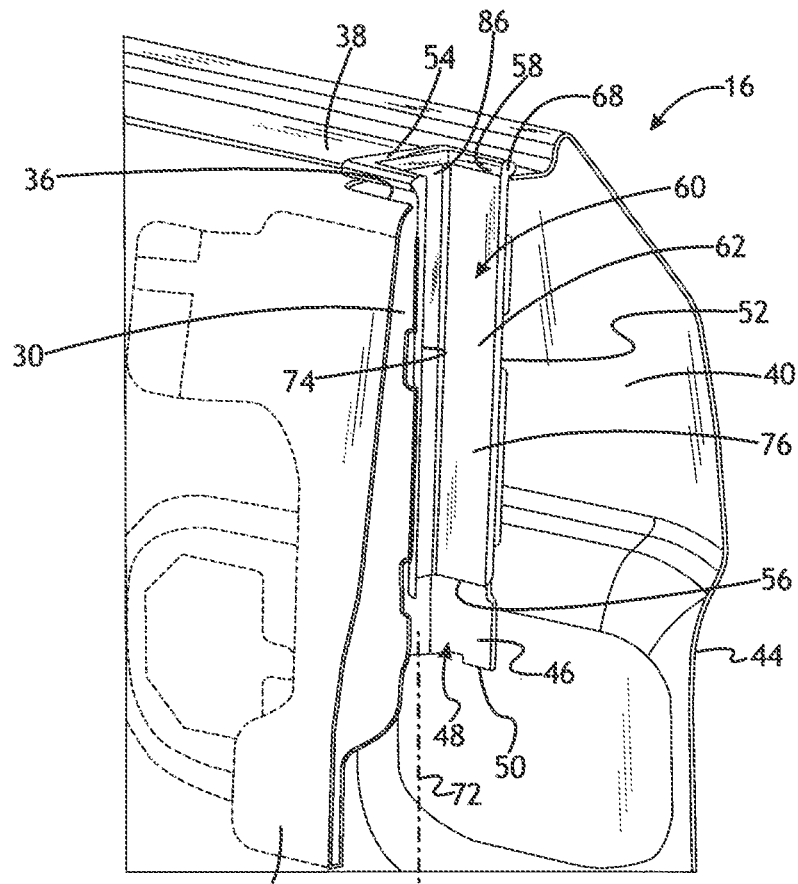
FIG. 3 is a view similar to FIG. 2 with the section cut through the retainer.

As shown in FIGS. 2 and 3, the voids 30 may be formed at least in part by an opening 36 in a surface 38 of the first door part 16 facing the second door part 22. The opening 36 leads to an open area 40 between inner and outer panels 42, 44 of the first door part 16. Further, if desired, a support bracket 46 may be provided coupled to an interior surface of the first door part 16, including either or both of the inner and outer panels 42, 44. The bracket 46 may surround and define at least part of the void 30, and may provide support for the insert 34 received in the void. In the implementation shown, the bracket 46 includes a passage 48 (FIG. 3) that extends from the opening 36 to an end 50 within the first door part 16 between the inner and outer panels 42, 44. The passage 48 is defined by an inner surface of one or more walls of the bracket 46, and the insert 34 may be received at least partially within the passage 48.

The insert 34 includes a body 52 having longitudinally opposed first and second ends 54, 56, an opening 58 in at least one end and a cavity 60 leading from the opening 58 and defined at least in part by an inner surface 62 of the body 52. A centerline or longitudinal axis 64 of the body 52 may extend through the center of mass of the body, and through the opening 58 and at least part of the cavity 60. The axis 64 may be a rotational axis extending between the first end 54 and the second end 56 and through the center of mass of the body 52. The location of the center of mass may be determined including only the axial length of the body 52 in which the cavity 60 is defined so any portion of the body 52 axially outboard of the cavity 60 is not included in determining the location of the center of mass. This may, for example, exclude alignment tabs or other non-symmetrical features that may be provided at or adjacent to one of the ends of the body 52. Similarly, the rotational axis 64 may also be located with reference to only the axial length of the body 52 in which the cavity 60 is defined so any portion of the body axially outboard of the cavity is not included in determining the location of the rotational axis. The body 52 may have any desired cross-sectional shape, and the cavity 60 and opening 58 may be sized and arranged to receive a pin 32 therein. In at least some implementations, the inner surface 62 is continuous, without any openings or voids, although voids could be provided to reduce material cost and weight, provide airflow or fluid drainage, or for any other reason. The longitudinal length of the body 52 between the first end 54 and second end 56 may be chosen as a function of the length of the pin 32 to be received therein, or otherwise.

In the implementation shown, the passage 48 in the first door part 16 is longitudinally longer than the insert body 52, and supports the body along the length of the body. In other words, limited or no lateral movement (where the lateral direction is perpendicular to longitudinal direction) is permitted between an outer surface 66 of the insert body 52 and bracket 46 defining the passage 48. This retains a desired location and orientation of the insert 34 within the first door part 16. To further retain the position of the insert 34 relative to the first door part 16, the insert 34 may include a stop surface 68 that engages the first door part 16 and limits insertion of the insert 34 into the passage 48. In the implementation shown, the stop surface is defined by a laterally outwardly extending flange 68 at or near the first end 54 of the insert body 52. The second end 56 of the insert 34 is smaller than the first end 54, and is received in the passage 48 as the insert is slidably inserted into the passage 48 until the flange 68 engages the first door part 16. The insert 34 may be slidably removably received in the first door part 16 to permit a different insert to be provided in the first door part, as will be set forth in more detail below. A friction fit may be provided between the first door part 16 and the insert 34 to firmly hold the insert, reduce vibrations or rattling of the insert, and permit the insert to remain in place in the first door part 16 when the second door part 22 is removed from the first door part.

In at least some implementations, the inner surface 62 and outer surface 66 of the insert body 52 are not parallel such that a lateral or radial thickness of portions of the body is not constant or uniform around the body and along its longitudinal length. In at least some implementations, a centerline 70 of the cavity 60 is not parallel to a centerline 72 (FIG. 3) of the passage 48 in which the insert 34 is received and is not parallel to the outer surface 66 of the insert body 52. Further, the centerline 70 of the cavity 60 is not parallel to or coincident with the centerline or rotational axis 64 of the body 52. Instead, the cavity 60 is inclined relative to the passage 48 and relative to the centerline or rotational axis 64 of the body 52 at angle α so that a pin 32 received in the cavity 60 is likewise inclined relative to the passage 48 to incline or cant the second door part 22 relative to the first door part 16. In at least some implementations, the angle α is between about 1 degree and 12 degrees, although other angles may be used if desired. By way of non-limiting examples, the insert shown in FIG. 5 includes a cavity having a centerline at an angle α of about 9 degrees relative to the plane (or relative to the longitudinal axis of the body), and the insert in FIG. 6 has a cavity at an angle α of about 3 degrees. Of course, the angle may change as needed for a particular application. In at least some implementations, an upper edge 73 (FIG. 1) of the door can be moved up to 10 mm closer to or farther from the correspondent portion of the door opening (i.e. a 20 mm distance between the two orientations), where that dimension does not include any play or tolerances in the door or related components (e.g. the hinge), and the movement is as a result of the insert.

In at least some implementations, the cavity 60 is defined by opposed first and second portions 74, 76 of the inner surface 62 that are inclined relative to the longitudinal axis 64 of the body 52. The distance from the first portion 74 of the inner surface 62 to the longitudinal axis 64 decreases along the length of the body 52 from the first end 54 to the second end 56, at least to the point, if any, in which the axis 64 intersects with the first portion 74. For example, in at least some implementations, the radial thickness of the body 52 along the first portion 74 and between the inner and outer surfaces 62, 66 is not uniform along the axial length of the cavity 60. And the distance from the second portion 76 of the inner surface 62 increases along the length of the body 52 from the first end 54 to the second end 56. Where the outer surface 66 is designed for a close fit within the passage 48 which is not parallel to the cavity 60 in the insert 34, the thickness of the insert body 52 at the first portion 74 increases from the first end 54 of the body to the second end 56, and the thickness of the body 52 at the second portion 76 decreases. In some implementations, the angle of the cavity 60 and resulting changes in thickness of corresponding portions of the body 52 may require that the opening 58 be offset relative to a center of a polygon or perimeter of the outer surface 66 of the body 52. Without doing so, the angle at which the cavity 60 is oriented may make part of the body 52 unacceptably or undesirably thin.

The angle of the cavity 60 may also be described with regard to an imaginary plane 80 (FIGS. 5 and 6) that is perpendicular to the longitudinal axis 64 of the body 52 and which intersects or includes the opening 58 at the first end 54 of the body. The centerline 70 of the cavity 60 is not perpendicular to the plane 80 and is instead inclined relative to the plane 80 at some angle other than 90 degrees.

Figure 4:
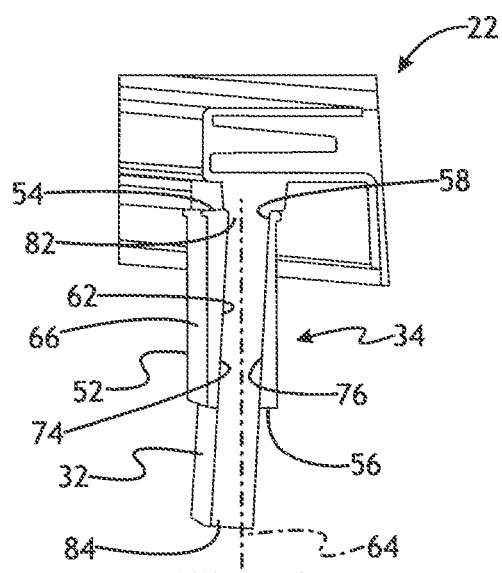
FIG. 4 is a fragmentary, cross-sectional perspective view of part of a second part of the door including a pin that is received within the retainer.

As shown in FIG. 4, the pins 32 may be tapered from a larger (e.g. thicker or wider) first end 82 attached to the second door part 22 to a smaller (e.g. thinner) second or free end 84. Thus, to provide a snug fit, which may generally be a line-to-line fit or slight friction fit to retain the second door part 22 coupled to the first door part 16, the cavity 60 may likewise be tapered. Hence, the surface area bounded by the inner surface 62 along a plane perpendicular to the centerline 70 of the cavity 60 decreases from the first end 54 of the body 52 to the second end 56. The taper angle of the inner surface 62 may generally match the taper angle of pin 32, and may be constant along the length of the cavity 60. As such, both the first portion 74 and second portion 76 may be inclined inwardly at the same angle toward the centerline 70 of the cavity 60.

In the implementation shown, the cavity 60 is a rectangular prism and the first portion 74 and second portion 76 are opposed, generally planar walls. The opposite third and fourth walls 86, 88 (FIG. 2) may be generally planar as well, and may be tapered toward each other, if desired. Of course, the cavity 60 may be a polygon in cross-section having any number of sides, and may be generally cylindrical or frustoconical or otherwise shaped, as desired for a particular application. With a cavity 60 that in cross-section is oval shaped, circular or similarly shaped, the first portion 74 and second portion 76 may be opposed portions of the inner surface 62 instead of planar sides, where the portions are angled to cause an incline in the second door part 22 relative to the first door part 16.

Figure 5:
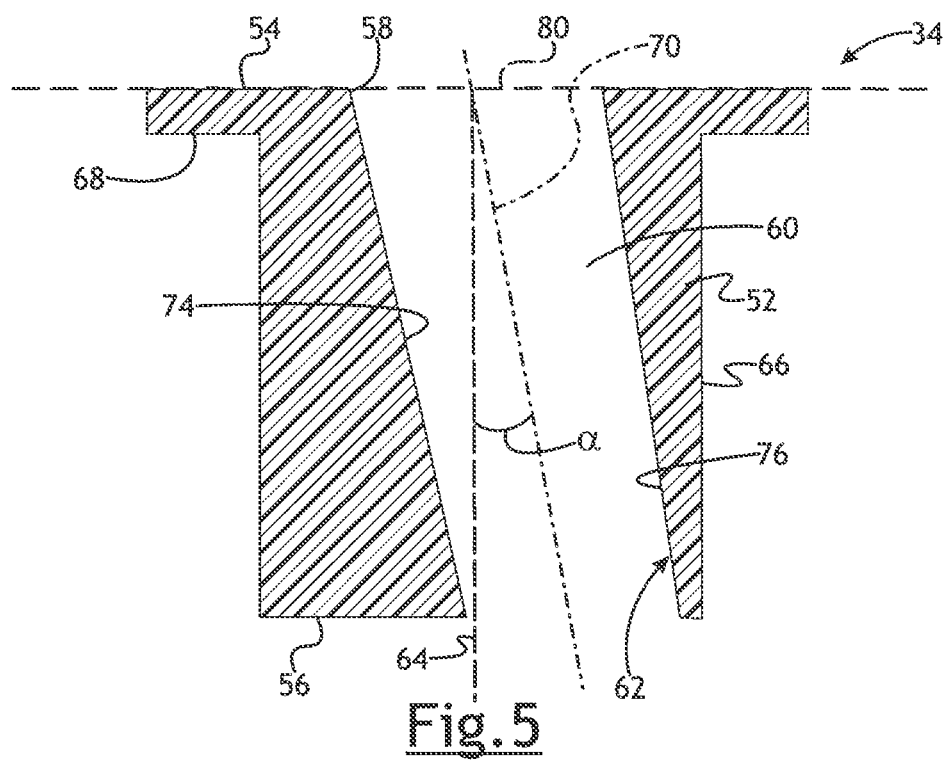
FIG. 5 is a diagrammatic cross-sectional view of the retainer.
Figure 6:
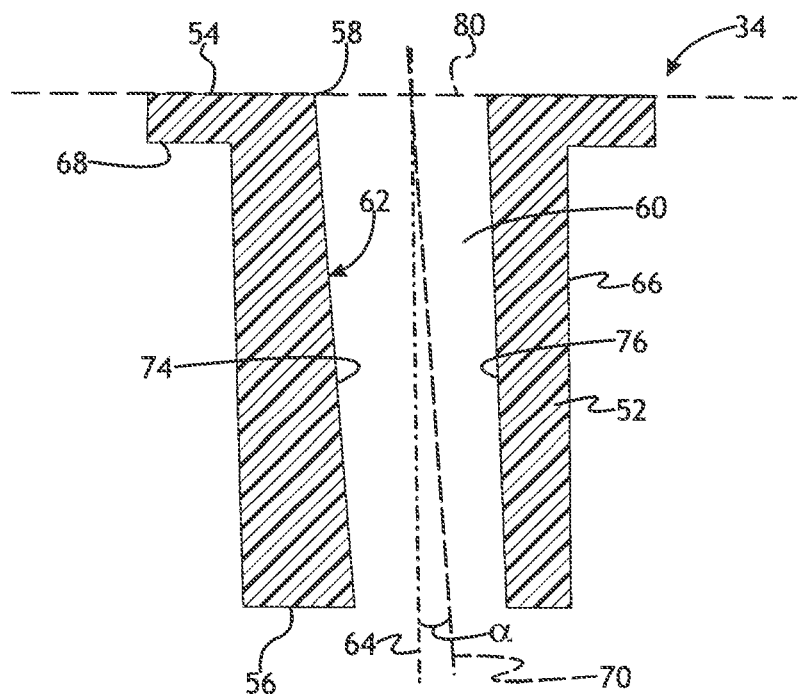
FIG. 6 is a diagrammatic cross-sectional view of a retainer.

To permit adjustment of doors 12 across a production run of doors, in which tolerances may vary the relative angle of the second door parts 22 relative to the first door parts 16, a set of inserts 34 may be provided for a vehicle 10. The inserts 34 may have cavities 60 at different angles to adjust different doors differently, as shown in FIGS. 5 and 6. This may be desired, for example, to improve the engagement of the second part 22 of the door 12 with one or more seals 28 between the door 12 and vehicle body 10 (e.g. in the area of the door opening 20). The inserts 34 may incline the second door part 22 toward the passenger compartment 14 and door opening 20 (e.g. to increase engagement with the seals 28) or away from the passenger compartment and door opening (e.g. to decrease engagement with the seals, for example, if the door is more difficult to close than desired). Hence, the cavity 60 of an insert 34 may be angled relative to the door opening 20 (in a closed position of the door) to provide a desired door fit. And the first portion 74 and second portion 76 of the inner surface may include a portion of the inner surface 62 that is closest to the door opening 20 and a portion that is farthest from the door opening, as best shown in FIGS. 2-4.

With multiple different inserts 34 each having a cavity 60 at a different angle, by removing one insert 34 and replacing it with another insert having a cavity at a different angle relative to the first door part 16, the inclination of the second door part 22 relative to the first door part can be changed. The plurality of inserts 34 may be provided in an assembly line and a desired insert chosen during initial assembly of the vehicle, or the inserts may be available to repair facilities and/or consumers as aftermarket or replacement parts to facilitate adjustment of the door 12 after initial assembly, and at any other time during the life of the vehicle 10.

What is claimed is:

1. An insert for a vehicle door having one part of the door that is separable from another part of the door, the insert comprising:
a body having a first end, a second end, a longitudinal axis extending between the first end and the second end and through the center of mass of the body, an opening at the first end, and an inner surface that defines a cavity extending from the opening toward the second end, the inner surface having a first portion and an opposing second portion wherein the distance from the first portion to the axis decreases along at least a portion of the cavity in the direction extending from the first end toward the second end, and the distance from the second portion to the axis increases along at least a portion of the cavity in the direction extending from the first end toward the second end.

2. The insert of claim 1 wherein a centerline through the center of the cavity is inclined relative to the axis at a non-zero angle.

3. The insert of claim 2 wherein the angle is between 1 degree and 12 degrees.

4. The insert of claim 1 wherein the center of mass includes only the axial length of the body in which the cavity is defined so any portion of the body axially outboard of the cavity is not included in determining the location of the center of mass.

5. The insert of claim 4 wherein the axis is also located with reference to only the axial length of the body in which the cavity is defined so any portion of the body axially outboard of the cavity is not included in determining the location of the axis.

6. The insert of claim 1 wherein the body also includes an outer surface facing outwardly away from the cavity and wherein a radial thickness of the body along the first portion and between the inner and outer surfaces is not uniform along the axial length of the cavity.

7. The insert of claim 6 wherein the radial thickness of the body along the first portion increases from the first end toward the second end along at least a portion of the axial length of the cavity.

8. The insert of claim 1 which also comprises a second insert having a second body that is separate from said body set forth in claim 1, the second body having a first end, a second end, an axis extending between the first end and the second end and through the center of mass of the second body, an opening at the first end, and an inner surface that defines a cavity extending from the opening toward the second end, the inner surface having a first portion and an opposing second portion wherein the distance from the first portion to the axis decreases from the first end toward the second end along at least a portion of the cavity, and the distance from the second portion to the axis increases from the first end toward the second end along at least a portion of the cavity, and wherein the angle of the first portion of the second body relative to the axis of the second body is different than the angle of the first portion of said body set forth in claim 1 relative to the axis of said body set forth in claim 1.

9. The insert of claim 8 wherein a centerline through the center of the cavity in the second body is inclined relative to the axis of the second body at a different angle than the angle between the centerline through the center of the cavity of said body set forth in claim 1 and the axis of said body set forth in claim 1.

10. A vehicle door assembly, comprising:
a first part adapted to be connected to a vehicle for movement relative to the vehicle between open and closed positions, the first part including a first connection feature;
a second part releasably coupled to the first part for movement with the first part when coupled to the first part, and to permit the second part to be removed from the first part, the second part including a second connection feature adapted to be releasably associated with the first connection feature; and
an insert between the first connection feature and the second connection feature, the insert having a body with a first end, a second end, a longitudinal axis extending between the first end and the second end and through the center of mass of the body, an opening at the first end, and an inner surface that defines a cavity extending from the opening toward the second end, the inner surface having a first portion and an opposing second portion wherein the distance from the first portion to the axis decreases from the first end toward the second end of the cavity along at least a portion of the cavity, and the distance from the second portion to the axis increases from the first end toward the second end of the cavity along at least a portion of the cavity.

11. The door assembly of claim 10 wherein the first connection feature is one of a pin or a void, and the second connection feature is the other of the pin or void.

12. The door assembly of claim 11 wherein the insert is received within the void and when the second part of the door is coupled to the first part of the door, the pin is received within the cavity of the insert, and wherein a centerline through the center of the cavity is inclined relative to the axis.

13. The door assembly of claim 10 which also comprises a second insert having a second body that is separate from said body set forth in claim 10, the second body having a first end, a second end, an axis extending between the first end and the second end and through the center of mass of the second body, an opening at the first end, and an inner surface that defines a cavity extending from the opening toward the second end, the inner surface having a first portion and an opposing second portion wherein the distance from the first portion to the axis decreases from the first end toward the second end of the cavity along at least a portion of the cavity, and the distance from the second portion to the axis increases from the first end toward the second end of the cavity along at least a portion of the cavity, and wherein the angle of the first portion of the second body relative to the axis of the second body is different than the angle of the first portion of said body set forth in claim 10 relative to the axis of said body set forth in claim 10, and wherein the second insert may replace the insert set forth in claim 10 to change the angle of the second part of the door relative to the first part of the door.

14. The door assembly of claim 13 wherein a centerline through the center of the cavity in the second body is inclined relative to the axis of the second body at a different angle than the angle between the centerline through the center of the cavity of said body set forth in claim 10 and the axis of said body set forth in claim 10.

15. The door assembly of claim 10 wherein the first part includes more than one connection feature, the second part includes a like number of connection features, and a like number of inserts are provided, and wherein one insert is associated with each set of a first connection feature and a second connection feature.

* * * * *